United States Patent [19]

Daugherty

[11] 4,226,413
[45] Oct. 7, 1980

[54] WHEEL MOUNTED WALKER WITH FOOT PEDAL BRAKE

[76] Inventor: Wilma J. Daugherty, 9282 Chapman Ave., Garden Grove, Calif. 92641

[21] Appl. No.: 958,782

[22] Filed: Nov. 8, 1978

[51] Int. Cl.$^3$ .............................................. A61H 3/04
[52] U.S. Cl. .................................... 272/70.4; 188/1 D
[58] Field of Search ........................ 272/70.4, 70.3, 70; 188/1 D; 297/5, 6, DIG. 4; D3/7; D12/129, 130, 131

[56] References Cited

U.S. PATENT DOCUMENTS

| | | | |
|---|---|---|---|
| D. 112,691 | 12/1938 | Comper | 272/70.3 |
| 130,283 | 8/1872 | Darrach | 272/70.4 |
| D. 181,957 | 1/1958 | Callahan | 297/5 UX |
| 1,895,150 | 1/1933 | Darnell | 188/1 D |
| 2,129,260 | 9/1938 | Bowser | 297/6 |
| 2,316,100 | 4/1943 | Nelson | 280/87.05 |
| 2,327,671 | 8/1943 | Rupprecht | 272/70 |
| 2,596,055 | 5/1952 | Thomas | 280/289 R |
| 2,654,416 | 10/1953 | Maniscalo | 188/109 |
| 2,673,987 | 4/1954 | Upshaw et al. | 297/DIG. 4 |
| 2,843,180 | 7/1958 | Schwartz | 272/70.3 |
| 2,862,544 | 12/1958 | Lilja | 272/70.3 |
| 3,252,704 | 5/1966 | Wilson | 272/70.3 |
| 3,488,088 | 1/1970 | Goldberg et al. | 272/70 X |
| 3,493,085 | 2/1970 | Libhart | 188/74 |
| 3,708,182 | 1/1973 | Markiel | 280/289 |
| 3,999,778 | 12/1976 | Markiel | 280/289 WC |
| 4,046,374 | 9/1977 | Breyley | 272/70.3 |
| 4,065,145 | 12/1977 | Chambers | 280/87.02 R |
| 4,159,110 | 6/1979 | Dodenhoff | 272/70.3 |

FOREIGN PATENT DOCUMENTS

| | | | |
|---|---|---|---|
| 1330189 | 5/1963 | France | 272/70.3 |
| 345114 | 4/1960 | Switzerland | 272/70.4 |
| 806651 | 12/1958 | United Kingdom | 272/70.4 |

*Primary Examiner*—Richard C. Pinkham
*Assistant Examiner*—Arnold W. Kramer
*Attorney, Agent, or Firm*—Fulwider, Patton, Rieber, Lee & Utecht

[57] ABSTRACT

A walker having a readily adjustable and disassemblable frame is equipped with two wheels in the rear and a centered lead wheel. The lead wheel, which is castored for increased directional stability, is equipped with a brake operated by a foot pedal. When the pedal is depressed, an axle on which the lead wheel rotates is forced toward the front of a pair of elongated slots in a wheel bracket. The top of the wheel then contacts a friction pad to apply a braking force. The user can depress the brake pedal with the toe of one foot without lifting the heel.

5 Claims, 4 Drawing Figures

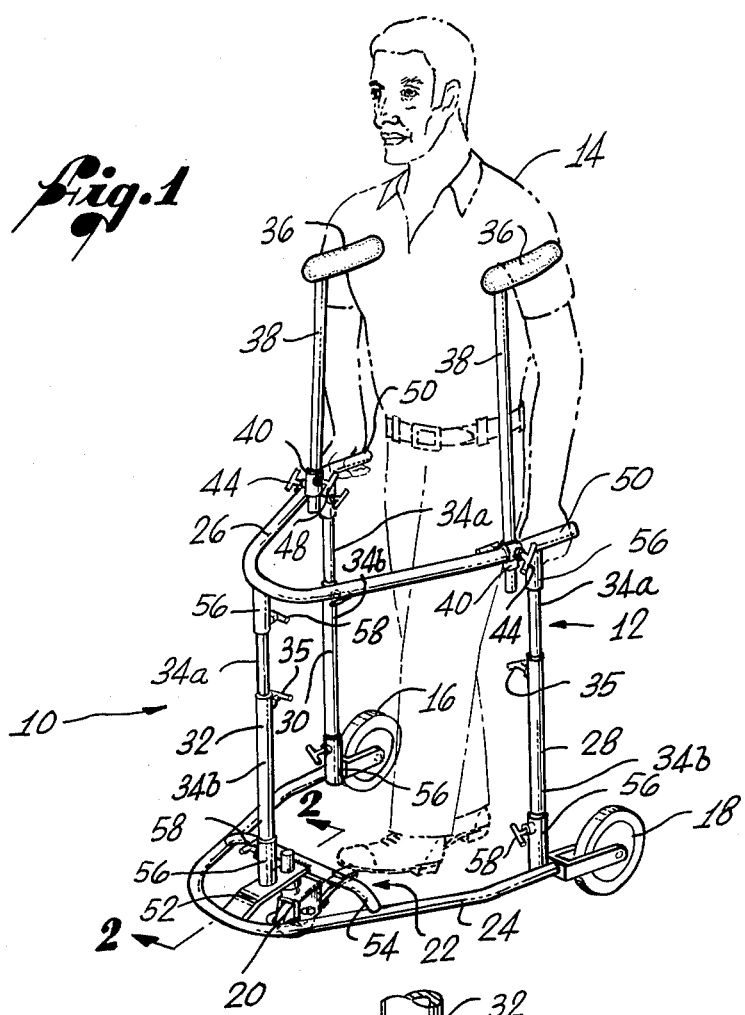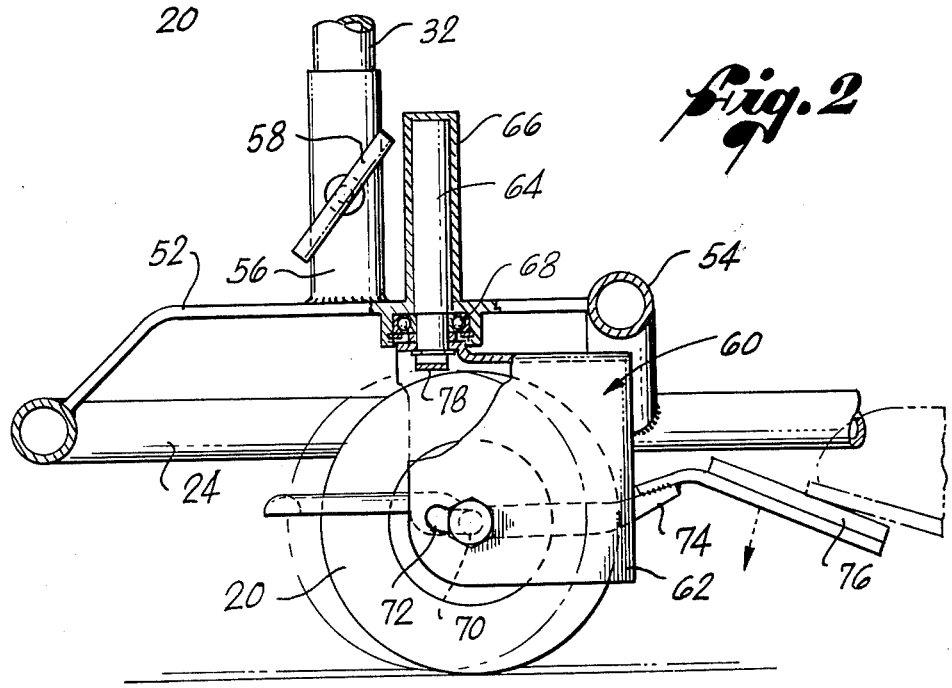

WHEEL MOUNTED WALKER WITH FOOT PEDAL BRAKE

BACKGROUND OF THE INVENTION

The present invention relates to a walker for use by an infirm person who requires external support while walking or standing and, more particularly, to such a walker that is provided with wheels.

A variety of walkers are known, most of which are in the form of a generally vertical frame, open in the back, which the user carries or slides along the floor. These devices are lighter and considerably less costly than wheel chairs and have the important added advantage of permitting the user to support his or her own weight to the extent desired. They can be used by persons who do not have sufficient coordination or upper body strength for crutches.

There are, however, some significant disadvantages to the use of previously known walkers. They are generally cumbersome despite their light weight and are difficult to store, ship or transport in an automobile. They often rest on four feet or wheels and, therefore, have a tendency to rock unstably on uneven terrain.

Wheeled walkers tend to be unsafe unless equipped with brakes and many users find that the operation of a brake requires more agility than they possess. Moreover, brakes that apply a smooth retarding force and do not tend to turn the walker are apt to be complex and susceptible to misadjustment and malfunction.

A principle objective of the present invention is to provide a walker that overcomes many or all the above-mentioned disadvantages, being equipped with wheels but nevertheless stable, having a brake that is easily operated, and being readily disassemblable to be stored or transported.

Other features and advantages of the present invention will become apparent from the following detailed description, taken in conjunction with the accompanying drawings, which illustrate, by way of example, the principles of the invention.

SUMMARY OF THE INVENTION

According to the present invention, a walker can be provided with three wheels so that it stands firmly, with all wheels in contact with the ground, despite any unevenness of the terrain. There are two trailing wheels, one on each side, and a centered lead wheel. A brake can be applied to the lead wheel so that the braking force does not tend to turn the walker or cause instability. Preferably a brake pedal is provided that is actuated by the toe of one foot without lifting the heel.

A particularly advantageous brake construction utilizes a wheel bracket for the lead wheel that includes a vertical shaft rotatably attached to a frame. The bracket has a pair of parallel elongated slots that slidably receive a horizontal axle on which the lead wheel turns. When the brake pedal is depressed, the axle moves forward along the slots until the lead wheel makes contact with a friction pad.

Preferably, the frame of the walker has upper and lower U-shaped portions connected by telescoping vertical members that permit height adjustment. The vertical members can be disconnected from the upper and lower portions so that the device can be disassembled when it is to be transported or stored.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a perspective view of a walker constructed in accordance with the present invention, a user of the walker with his foot in position to apply the brake being shown in phantom lines;

FIG. 2 is an enlarged, partially broken away, side elevation of the wheel bracket and brake of the walker, the wheel being shown in solid lines in its free turning position and in phantom lines in its braked position;

DESCRIPTION OF THE PREFERRED EMBODIMENT

Figure 3:
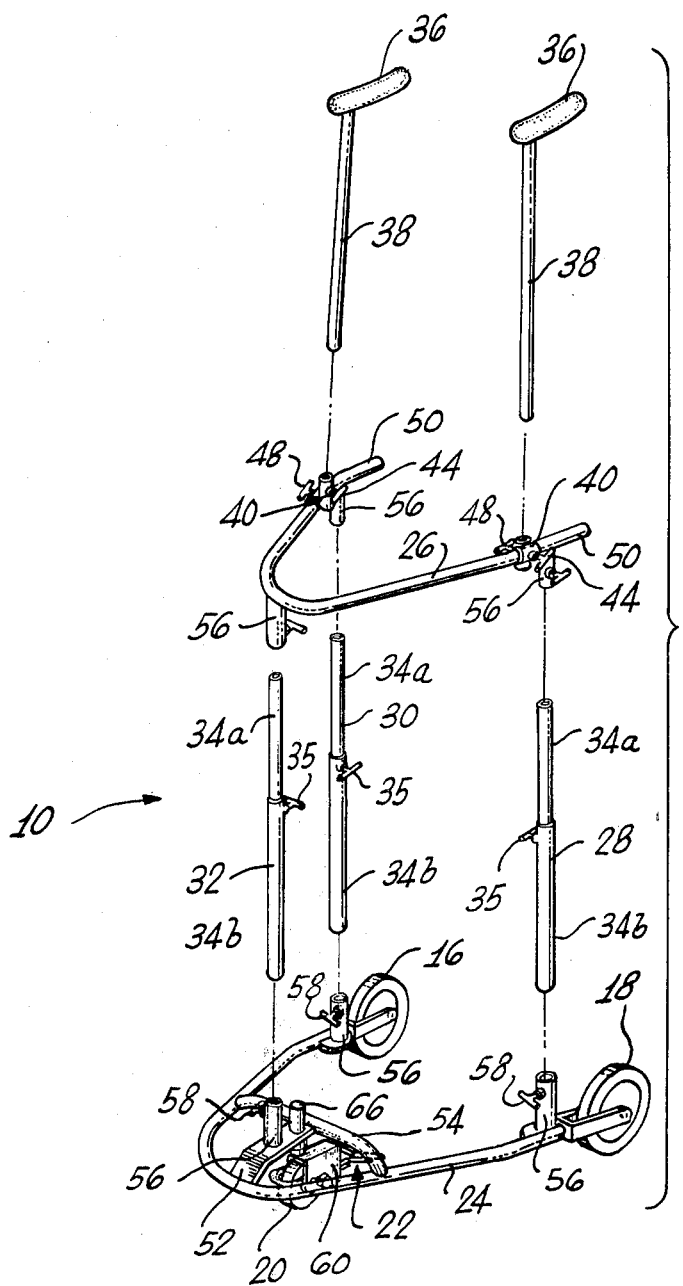
FIG. 3 is an enlarged exploded view of the walker.
Figure 4:
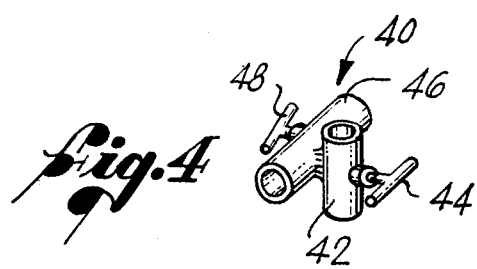
FIG. 4 is an enlarged perspective view of a connector that attaches the pad-supporting rods to the upper frame member of the walker.

An exemplary walker 10, illustrated in FIGS. 1–4 of the accompanying drawings, embodies many aspects of the present invention. In general, it includes an open frame 12 that surrounds and defines a space in which the user 14 stands, three wheels 16, 18 and 20 on which the frame is movable, and a brake mechanism 22 for controlling its movement.

The frame 12 is formed of tubular steel or aluminum and includes horizontal lower and upper portions 24 and 26 each formed by a U-shaped member. Each of these U-shaped members 24 and 26 is arranged so that is surrounds the user 14 (shown in phantom lines in FIG. 1) on three sides, being open at the rear.

Three vertical members 28, 30 and 32 connect the lower and upper members 24 and 26, each vertical member being formed by two telescoping tubular pieces 34a and 34b. Winged threaded fasteners 35 permit the upwardly protruding inner pieces 34a of the vertical members 28, 30 and 32 to be secured in selected positions, rendering the height of the frame 12 easily adjustable.

In this exemplary apparatus, the user 14 is supported by two soft pads 36 similar to those commonly provided on the top ends of crutches. Each pad 36 is mounted atop a rod 38 that extends upwardly and slightly inwardly from the upper member 26 on one side of the walker 10, the rods being attached to the upper member by cross-shaped tubular connectors 40 (best shown in FIG. 4). A sleeve-like vertical portion 42 of each connector 40 slidably receives the corresponding rod 38 and permits the height of the rod to be adjusted by a winged threaded fastener 44 that firmly anchors the rod to the connector. The horizontal portion 46 of each connector 40 is also a sleeve that is rotatable on the upper member 26 to adjust the angle the rod 38 makes with the vertical, being secured by a similar fastener 48. By properly adjusting the rods 38, the pads 36 can be positioned to fit comfortably under the user's arms. The extreme rear portions of the upper member 26, behind the connectors 40, serve as hand grips 50.

It should be noted that the particular provisions described above for supporting the user 14 are merely illustrative. Other arrangements of hand grips or harnesses, for example, may be employed instead to meet the needs of a particular person.

Two of the vertical members 28 and 30 are positioned near the open rear end of the frame 12 and are attached directly to the upper and lower members 24 and 26. The third vertical member 32 is centered, extending downwardly from the front end of the upper member 26. At the bottom, it is secured to a generally horizontal strut 52 that projects rearwardly from the front center of the lower member 24 to a cross-piece 54 that subtends the distance from one side of the lower member to the other, just behind the front end.

Each vertical member 28, 30 and 32 is inserted at its ends in one of several in sockets 56, integrally formed with the upper and lower members 24 and 26, and secured by winged screw fasteners 58. The entire walker 10 can be easily and quickly disassembled (as is apparent from the exploded view of FIG. 3) to form a flat, compact package by loosening the fasteners 58 and removing the vertical members 28, 30 and 32 from their sockets 56.

At its extreme rear ends, behind the point of fastening to the rearmost vertical members 28 and 30, the lower member 24 is bifurcated to form narrow openings in which the two trailing wheels 16 and 18 are rotatably mounted on fixed horizontal axles (not shown). The lead wheel 20 is carried by a wheel bracket 60 at the front of the walker (best shown in FIG. 2). Each wheel 16, 18 and 20 is solid rather than spoked so that nothing can become tangled or caught in wheel openings.

A front wheel bracket 60 (best shown in FIG. 2) comprises a metal plate bent to form a downwardly facing yoke 62 within which the wheel 20 is disposed. A short vertical shank 64 projects upwardly from the top of the yoke 62 into a socket 66 carried by the strut, the shaft being rotatably held in the socket by a snap ring 68 so that the entire wheel bracket 60 is pivotable with respect to the frame 12.

A horizontal axle 70 that carries the lead wheel 20 extends across the yoke 62 and is slidably received at its ends by a pair of elongated curved slots 72 in the sides of the yoke. The axle 70 is secured to an approximately horizontal arm 74 that is extended to form a foot pedal 76 projecting rearwardly into the standing area of the walker 10.

With the walker 10 in its normal mobile condition, the axle 70 is positioned at the rear of the slots 72 (as shown in solid lines in FIG. 2) where it is offset behind the vertical rotational axis of the shank 64. The lead wheel 20 is in this way given a caster so that the walker 10 tends to move in a straight line. When the pedal 76 is depressed, however, the axle 70 is forced toward the front ends of the slots 72 (as shown in phantom lines in FIG. 2) and rises relative to the frame 12 due to the upward curvature of the slots. If the pedal 76 is pushed far enough, the top of the wheel 20 contacts a friction pad 78 mounted on the bottom of the shaft 64 and applies a braking force to stop the foward motion of the walker 10. At this point, the lead wheel 20 still has some caster, trailing the rotational axis of the shank 64 for increased stability.

It should be noted that only one brake 22 is needed since the braking force is applied to the centered wheel 20, thereby simplifying the device 10 and eliminating the need to adjust and balance two or more brakes. No complex brake linkage is required since the brake pedal 76 is located directly behind the brake itself and rigidly connected to the arm and axle where it provides maximum reliability in a simple construction. Another important advantage of the brake 22 of this invention is that the pedal 76, being close to the ground, can be depressed with the toe of one foot, without lifting the heel of that foot. Thus the motion required to apply the brake 22 (as shown in FIG. 1) is less than that required when walking with the device 10. Neither foot need be lifted completely off the ground and the position of the hands need not be changed. To release the brake 22, it is merely necessary to slip the toe of the foot under the pedal 76 and lift the pedal so that the axle 70 moves rearwardly and downwardly in the slots 72 and the wheel 20 no longer contacts the friction pad 78.

In addition to the above advantages, the walker 10 is easily and inexpensively manufactured because of its small number of simple components. It is also lightweight, collapsible and readily adjustable to the size of the user 14, even a small child.

While a particular form of the invention has been illustrated and described, it will also be apparent that various modifications can be made without departing from the spirit and scope of the invention.

I claim:

1. A walker for providing support for a person who is standing or walking comprising:

a rigid frame surrounding and defining a space in which said person can stand, said frame comprising a generally U-shaped horizontal lower member open at the rear, a generally U-shaped horizontal upper member open at the rear, a cross-piece that subtends the distance from one side of the lower member to the other, a generally horizontal strut that projects rearwardly from the center of said lower member to said cross-piece, and a plurality of vertical members extending downwardly from said upper member, one of said vertical members being connected to said strut;

support means attached to said upper member for supporting said person;

a pair of trailing wheels rotatably attached to said frame and disposed on opposite sides of said space;

a wheel bracket centered with respect to said trailing wheels and disposed at the front of said space, said bracket including a substantially vertical shaft by which it is pivotably attached to said strut;

a lead wheel rotatably attached to said bracket; and brake means for applying a braking force to said lead wheel, said brake means including a pedal for actuation thereof, said pedal extending from said wheel bracket beneath and past said cross-piece at a height that permits engagement thereof by the toe of said persons's foot without lifting the heel of said foot.

2. The walker of claim 1 further comprising a horizontal axle on which said lead wheel is mounted, said wheel bracket defining a pair of parallel elongated slots in which said axle is movably received, and said brake means further including a friction pad disposed above said lead wheel, whereby said lead wheel can be brought into engagement with said pad by depressing said pedal to apply said braking force.

3. The walker of claim 1 wherein said vertical members each comprise at least two telescopically interrelated pieces and means for securing said pieces in a fixed position with respect to each other, whereby the height of said walker is adjustable.

4. The walker of claim 1 wherein said axle is offset rearwardly from the rotational axis of said shaft.

5. The walker of claim 1 further comprising a socket carried by said strut between said cross-piece and said vertical member connected to said strut, said shaft being received by said socket.

* * * * *